United States Patent [19]

Wesch et al.

[11] Patent Number: 5,756,555
[45] Date of Patent: May 26, 1998

[54] ACOUSTICALLY ACTIVE PLASTISOLS

[75] Inventors: Karl Wesch, Waldbrunn; Klaus Ruch, Wiesloch, both of Germany

[73] Assignee: Henkel Teroson GmbH

[21] Appl. No.: 765,414

[22] PCT Filed: Jun. 12, 1995

[86] PCT No.: PCT/EP95/02259

§ 371 Date: Dec. 20, 1996

§ 102(e) Date: Dec. 20, 1996

[87] PCT Pub. No.: WO95/35345

PCT Pub. Date: Dec. 28, 1995

[30] Foreign Application Priority Data

Jun. 20, 1994 [DE] Germany .......................... 44 21 012.4

[51] Int. Cl.⁶ .................................................. C08J 9/30
[52] U.S. Cl. ............................... 521/73; 521/74; 521/75; 521/78
[58] Field of Search .......................... 521/73, 74, 75, 521/78

[56] References Cited

U.S. PATENT DOCUMENTS

| | | | |
|---|---|---|---|
| 3,066,110 | 11/1962 | Cornell | 521/73 |
| 4,423,161 | 12/1983 | Cobbs, Jr. | 521/73 |
| 4,434,251 | 2/1984 | Sasajima et al. | 521/73 |
| 5,252,623 | 10/1993 | Sugino et al. | 521/73 |
| 5,520,961 | 5/1996 | Lysell et al. | 521/76 |

*Primary Examiner*—Morton Foelak
*Attorney, Agent, or Firm*—Ernest G. Szoke; Wayne C. Jaeschke; Martin G. Meder

[57] ABSTRACT

Plastisol compositions based on vinyl chloride/vinyl acetate copolymers produced by suspension polymerization have a low viscosity, even with low polymer-to-plasticizer ratios, so that they may be used for plastisol formulations suitable for airless spraying. The compositions are stable in storage and show good gelation properties. Coatings based on these plastisols have a good noise-damping effect, even with high vinyl acetate contents.

29 Claims, 2 Drawing Sheets

ACOUSTICALLY ACTIVE PLASTISOLS

FIELD OF THE INVENTION

This invention relates to the use of sprayable plastisol compositions for soundproofing.

BACKGROUND OF THE INVENTION

Nowadays, very thin metal plates are almost exclusively used in the production of vehicles, machines and appliances. Under the effect of mechanically moving parts or running engines, these thin plates are inevitably made to vibrate, generating sound in the process. Another cause of troublesome noise, particularly in travelling motor vehicles, are the particles (stones and chippings, sand, water) which are thrown up by the wheels against the wheel arches and the underbody of the vehicle. This noise is particularly troublesome and unpleasant because it contains a large percentage of relatively high-frequency sound components.

Numerous proposals have been put forward with a view to reducing both types of sound. Accordingly, to reduce sound emission and mechanical vibration, the plates used in particular in automotive construction and in the manufacture of domestic appliances are provided with soundproofing coatings, so-called antivibration coatings.

In the conventional process, mixtures of fillers of high specific gravity and bitumen are extruded to sheets from which the corresponding shapes are then stamped or cut out. They are then bonded to the metal parts in question and may have to be adapted to the shape thereof by heating. Although these bitumen sheets are extremely brittle and tend to flake off the plate, particularly at low temperatures, they are still commonly used by virtue of their low price. Even the frequently proposed additions of elastomers produce only a slight improvement which is inadequate for many applications. In addition, the preformed bitumen shapes are impossible to apply to intricately shaped or awkwardly situated parts of machines or motor vehicles, for example the inner surfaces of the hollow interiors of motor vehicle doors. Another disadvantage is that, in many cases, several different shapes are required for a single vehicle or appliance, so that expensive stock-keeping is necessary.

Accordingly, there has been no shortage of attempts to eliminate the disadvantages of bitumen sheets by using other polymer systems. For example, filler-containing aqueous polymer dispersions of polyvinyl acetate or ethylene/vinyl acetate copolymers have been developed for spraying onto the metal parts in the necessary layer thickness. Unfortunately, these systems are unsuitable for industrial use for high-volume production because the water present in the layer applied by spraying cannot be removed quickly enough, particularly from relatively thick layers.

The soundproofing properties of polymer coatings are at their best in the vicinity of the glass transition temperature of the polymer system because, at temperatures in this range, the mechanical vibration energy is converted into heat through molecular flow processes by virtue of the viscoelasticity of the polymer. Conventional sprayable coating materials based on PVC plastisols, which are widely used for example for undersealing in the automotive industry, have no significant soundproofing effect in the working temperature range from −20° C. to +60° C. because the maximum glass transition temperature is in the range from about −20° C. to +50° C., depending on the plasticizer content.

Accordingly, attempts have been made to modify these conventional PVC plastisols in such a way that they would have better soundproofing properties in the working temperature range from −20° C. to +60° C. Thus, DE-A-35 14 753 describes coatings which contain polyunsaturated compounds, for example diacrylates or triacrylates, peroxide crosslinkers and inorganic fillers in typical PVC plastisols. However, in their cured state, plastisols such as these are as hard as glass and brittle so that they are unsuitable for use in automobile construction because they lack flexibility, particularly at low temperatures. In addition, these formulations have a very low loss factor (tan δ), so that their soundproofing effect is not very pronounced.

DE-A-34 44 863 describes compositions containing PVC or vinyl chloride/vinyl acetate copolymers, optionally methyl methacrylate homopolymers or copolymers, a plasticizer mixture and inert fillers. The plasticizer mixture consists of plasticizers compatible with the methyl methacrylate polymers and plasticizers for the vinyl chloride polymers which are incompatible with the methacrylate polymer optionally present. The plastisols thus obtained have improved soundproofing properties in relation to conventional PVC plastisols. However, their soundproofing effect deteriorates again, particularly at temperatures above about 30° C. If an attempt is made to shift the range of the maximum loss factor (tan δ) to higher temperatures by varying the quantitative ratios between the individual components, the coating suffers a very significant reduction in its flexibility at low temperatures. However, reduced flexibility at low temperatures is particularly problematical for applications in automotive construction. In addition, the loss factor of these formulations is drastically reduced at lower temperatures. Accordingly, plastisol compositions of the type in question only ever have a sufficiently high loss factor over a very narrow temperature range. As already mentioned, the compositions according to DE-A-34 44 863 require a plasticizer mixture in which one of the plasticizers has to be compatible with the methacrylate and incompatible with the PVC while the other plasticizer has to be compatible with the PVC. This seriously restricts the choice of suitable plasticizers, the polymethacrylate-compatible plasticizers in particular being extremely expensive so that it is desirable for this reason also to find simpler and more economical alternatives.

DE-C-38 30 345 proposes a sprayable plastisol composition consisting of a mixture of a first polymer component, which forms the continuous phase after gelation of the plastisol, and a second lightly crosslinked polymer component which is only partly swollen after gelation of the plastisol and which is dispersed in the continuous phase, the continuous phase largely being responsible for the mechanical properties, such as abrasion resistance, flexibility at low temperatures, hardness and adhesion to the substrate while the finely dispersed, swollen polymer phase is largely responsible for the soundproofing properties of the gelled coating.

To reduce the noise caused by particle impact, DE-C-40 13 318 proposes two-layer coatings consisting of an inner, soft layer and an outer layer which largely prevents the abrasion of the coating as a whole. Although DE-C-40 13 318 may well be capable of damping mechanical vibration and of reducing the noise caused by particle impact, two coatings have to be successively applied to the substrates to achieve these objectives. This involves the storage of two materials and the use of two application systems. To simplify application in vehicle construction, it is desirable to have coatings which can be applied in a single layer and, preferably, with an existing application system.

Accordingly, to obtain an inexpensive coating, it is desirable to be able to resort to commercially available polymers and plasticizers produced in large quantities.

Accordingly, the problem addressed by the present invention was to provide a coating for stiff substrates, more particularly for metal plates in the underbody region of motor vehicles, including wheel arches, which would have a vibration-damping effect and would also inhibit corrosion and would be abrasion-resistant and which would significantly reduce the noise caused by particle impact and, in addition, could be applied as a single coating using existing plastisol application systems and would preferably consist of commercial polymers and plasticizers.

DETAILED DESCRIPTION OF THE INVENTION

It has now surprisingly been found that coatings of plastisol compositions based on vinyl chloride/vinyl acetate copolymers containing 5 to 20% by weight of vinyl acetate as comonomer are both corrosion-inhibiting and abrasion-resistant and, at the same time, have a vibration-damping effect and significantly reduce the noise caused by particle impact. Plastisols based on vinyl chloride/vinyl acetate copolymers and their use as abrasion-resistant coatings are known per se. Normally, however, these copolymers with their low vinyl acetate content of around 2 to 14% by weight, based on the copolymer, are added to a plastisol containing a PVC homopolymer as its principal constituent. This typical addition is supposed to lower the gelation temperature. The PVC powders which are used in the known plastisols are very fine-particle polymer powders which are produced as so-called paste types by emulsion polymerization or micro-suspension polymerization. Hitherto, mainly small quantities of suspension polymers were added to the plastisol composition as so-called extender polymers. Although suspension polymers with a high vinyl acetate content in the copolymer were also used as the principal component in the plastisol, the compositions in question had a high plasticizer content. However, the novel feature is that copolymers of high vinyl acetate content are used as the principal component in corresponding plastisol coatings with a low plasticizer content and that the coatings in question are suitable for noise suppression in addition to their anti-abrasion function. Their suitability for noise suppression is all the more surprising insofar as, according to conventional teaching, optimal noise suppression is obtained at the glass transition temperature of the composition. The glass transition temperature of plastisols is determined by the polymer used and by the type and quantity of plasticizer used. In the case of the conventional sprayable PVC plastisols used for underbody protection in the automotive industry, the glass transition temperature and, hence, the acoustic damping maximum is at temperatures of 0° C. to −10° C. or even lower on account of the high plasticizer content. The glass transition temperature of PVC homopolymers is 81° C. and the glass transition temperature of polyvinyl acetate homopolymer 32° C. The glass transition temperature of copolymers may be calculated in advance using Fox's formula (T. G. Fox, *Bull. Am. Phys. Soc.*, 1, 122 [1956]), so that the glass transition temperature of vinyl chloride/vinyl acetate copolymers is distinctly below the glass transition temperature of the PVC homopolymer, especially where the copolymer has a high vinyl acetate content. Accordingly, the glass transition temperature of a plastisol of vinyl chloride/vinyl acetate copolymer is also lower than that of a plastisol of PVC homopolymers. Accordingly, sprayable plastisols based on vinyl chloride/vinyl acetate copolymers had not been expected to produce useful noise suppression.

This additional surprising property of the sprayable plastisols according to the invention makes it possible to satisfy the requirements of the automotive industry of combining the functions of underbody protection (protection against abrasion) and noise reduction in one and the same product. It is particularly surprising and economically advantageous that commercial vinyl chloride/ vinyl acetate copolymers can be used for the plastisols according to the invention. The suspension polymers are particularly preferred for reasons of availability. In addition, the use of the suspension polymers leads to a desirable, low viscosity of the plastisol despite its favorable gelation properties.

Accordingly, the present invention relates to sprayable plastisol compositions which can be sprayed with conventional plastisol application systems and which can be conventionally gelled. These plastisol compositions are characterized in that they contain a) 5 to 60% by weight of at least one powder-form vinyl chloride/vinyl acetate copolymer,
b) 5 to 65% by weight of plasticizers,
c) 0 to 40% by weight of fillers,
d) 0.01 to 5% by weight of a coupling agent,
e) optionally other reactive additives and further auxiliaries and additives, the sum of the individual components being 100% by weight. Particularly suitable vinyl chloride/vinyl acetate copolymers have a vinyl acetate content of 5 to 20% by weight and preferably 7 to 19% by weight, based on the copolymer. The molecular weight or rather the molecular weight distribution of PVC or PVC copolymers is normally measured by the K value in accordance with DIN 53726. The copolymers to be used in accordance with the invention have a K value of 40 to 80 and preferably 50 to 65. The ratio of copolymer to plasticizer is 1:1 to 1:4 and preferably 1:1.5 to 1:2.5.

Suitable plasticizers are, generally, any conventional plasticizers (cf., for example, Paul E. Bruins, Plasticizer Technology[Rheinhold Publ. Corp., N.Y.], Vol. 1, pages 228–232), preferably alkyl phthalates, such as dibutyl phthalate, dioctyl phthalate, benzyl butyl phthalate, dibenzyl phthalate, diisononyl phthalate (DINP), diisodecyl phthalate (DIDP) and diundecyl phthalate (DIUP). However, known plasticizers from the group of organic phosphates, adipates and sebacates or even benzyl benzoate, alkyl sulfonic acid esters of phenol or cresol, dibenzyl toluene or diphenyl ether are also suitable. The selection criteria for the plasticizers preferably used are determined on the one hand by the polymer composition and, on the other hand, by the viscosity and gelation conditions of the plastisol and by the required acoustic properties.

Suitable fillers for the plastisols according to the invention are any fillers known per se, for example calcium carbonate in the form of the various chalks, heavy spar, mica, vermiculite. Heavy spar or calcium carbonate is particularly preferred.

The plastisols according to the invention may contain reactive additives such as, for example, diisocyanates or polyisocyanates, preferably in blocked or microencapsulated form, and diamines or polyamines or polyaminoamides and/or hydroxyfunctional compounds such as, for example, polyester polyols or polyether polyols. Further examples of reactive additives are combinations of di- or polyepoxy compounds with diamines or polyamines or polyaminoamides. Mono-, di- and/or trimethacrylates or acrylates may also be added in combination with peroxides although this is not among the preferred embodiments of the plastisol compositions according to the invention because the addition of the unsaturated compounds in combination with peroxides often leads to storability problems, in addition to which the flexibility of such compositions at low temperatures is often unsatisfactory on account of the high degree of crosslinking.

In many applications, coupling agents have to be added. Suitable coupling agents are the various polyaminoamides, epoxy resins in combination with heat-curing crosslinking agents (for example dicyanodiamide), phenolic resins, terpene/phenol resins and (blocked) diisocyanates and polyisocyanates. Polyaminoamides based on polyamines and dimerized or polymerized fatty acids are preferably used. The coupling agents are typically used in quantities of 0.01 to 5% by weight, based on the plastisol formulation as a whole.

In addition, the plastisols according to the invention may optionally contain other auxiliaries and additives of the type typically encountered in plastisol technology. Such auxiliaries and additives include, for example, pigments, antiagers, flow aids and blowing agents for the production of foamed plastisols. Suitable blowing agents are any blowing agents known per se, preferably organic blowing agents from the class of azo compounds, N-nitroso compounds, sulfonyl hydrazides or sulfonyl semicarbazides. Azo-bis-isobutyronitrile and, in particular, azodicarbonamide are mentioned as examples of suitable azo compounds; dinitrosopentamethylene tetramine is mentioned as an example of a suitable nitroso compound, 4,4'-hydroxy-bis-(benzenesulfonic acid hydrazide) is mentioned as an example of a suitable sulfohydrazide and p-toluene sulfonyl semicarbazide is mentioned as an example of a suitable semicarbazide.

Another method of foaming the plastisols according to the invention is to add so-called hollow microbeads to the plastisols. Hollow microbeads often consist of polyvinylidene chloride and may be directly added to the plastisol in prefoamed form as hollow microbeads. In one particularly preferred embodiment, however, the "hollow microbeads" are added to the plastisol in unfoamed form as a fine-particle powder. These unfoamed "hollow microbeads" only expand during gelation of the plastisol, producing a very uniform and fine-cell foam. Corresponding "hollow microbeads" are commercially available, for example under the name of Expancel, a product of Nobel Industries.

The foamed plastisols are particularly suitable for reducing noise caused by particles (stones and chippings, sand, water) impacting on travelling motor vehicles. Since it is mainly the wheel arches and parts of the underbody that are affected in this way, the foamed plastisols are also preferably used in these areas.

Another application for the foamed plastisols is their use as so-called pillar fillers in cavities, such as the roof cross-ties or the A-, B- and/or C-pillars of a motor vehicle. In cases such as these, the entire cross-section of the cavity is filled with the foamed plastisol along the lines of a plug to prevent the columns of air trapped in the cross-ties from being able to begin vibrating.

Even if it is mainly vibration-damping properties that are to be achieved with the plastisol coating, this effect can often be enhanced by foaming.

The plastisols according to the invention are surprisingly distinguished by a high loss factor which is necessary for effective vibration damping. This loss factor was determined in known manner either by dynamic/mechanical thermoanalysis (DMTA) or by the Oberst flexural fatigue test.

To determine the reduction in the noise produced by particle impact (chippings, water spray and the like), plates coated with the plastisols according to the invention were tested by the APAMAT® method. In this method, balls are projected against the coated side of the plate and the sound pressure spectrum of the coated plate is compared with the sound pressure spectrum of an untreated plate. The difference between the two sound pressures is plotted against the frequency.

The invention is illustrated by the following Examples which are purely illustrative in character and do not cover the entire range of the plastisols according to the invention. However, the full range of plastisols according to the invention may be worked out by the expert from the foregoing observations.

The parts mentioned in the following Examples are parts by weight, unless otherwise indicated.

EXAMPLES

Plastisols were prepared while stirring from the following components using a dissolver for homogenization:

| | |
|---|---|
| PVC homopolymer or copolymer | 45 parts |
| diisononylphthalate | 26 parts |
| calcium oxide | 1 part |
| chalk (ground) | 15.5 parts |
| chalk (precipitated) | 8.0 parts |
| zinc oxide | 0.5 part |
| polyaminoamide (Euretek 507, a product of (Witco) | 1.0 part |
| naphtha (Isopar H, a product of Exxon) | 3.0 parts. |

By virtue of their viscosity (approx. 1 to 3 Pa.s, as measured at 23° C. with a Contraves Rheomat 30, System 14), the plastisols thus prepared are sprayable compounds and are distinguished by high stability in storage.

The acoustic damping values (dcombi) set out in Tables 1 and 2 below were determined in accordance with DIN 53440—the Oberst method (at 200 Hz). The measurements were carried out at various layer thicknesses and then standardized to a coating weight of 50%, i.e. the weight of the coating with the acoustically damping plastisol amounted to 50% of the weight of the metal. The measurements were also standardized to a layer thickness ratio of 4:1, i.e. in the case of a 1 mm thick metal strip, the thickness of the coating was 4 mm. The dimensions of the spring steel plates used for the Oberst method were 240×10 mm for a thickness of 1 mm. The metal strip was coated with the plastisol according to the invention over a length of 200 mm. The plastisols were applied to the measuring strip (spring steel) using a thin coating of primer and were gelled for 25 minutes at 160° C.

TABLE 1

| | Oberst damping values - mass ratio 50% Example | | | | | | | |
|---|---|---|---|---|---|---|---|---|
| | 1 (Comparison) | 2 (Comparison) | 3 (Comparison) | 4 | 5 | 6 | 7 | 8 |
| K Value | 70 | 60 | 70 | 62 | 60 | 59 | 50 | 60 |
| Vinyl acetate content | 0 | 0 | 5 | 7 | 14 | 15 | 14 | 20 |
| Viscosity [Pa · s] | 13 | 15 | 17 | 3 | 2 | 2.1 | 2.2 | 2.5 |
| −10 | 0.092 | 0.106 | 0.104 | 0.092 | 0.073 | 0.095 | 0.075 | 0.096 |
| 0 | 0.112 | 0.101 | 0.112 | 0.108 | 0.092 | 0.120 | 0.120 | 0.117 |
| 10 | 0.088 | 0.075 | 0.090 | 0.104 | 0.113 | 0.123 | 0.128 | 0.111 |
| 20 | 0.057 | 0.047 | 0.052 | 0.076 | 0.095 | 0.089 | 0.091 | 0.073 |
| 30 | 0.030 | 0.029 | 0.028 | 0.044 | 0.060 | 0.042 | 0.050 | 0.035 |
| 40 | 0.012 | 0.012 | 0.011 | 0.021 | 0.025 | 0.016 | 0.018 | 0.014 |

TABLE 2

Oberst damping values - layer thickness ratio 4:1

| | Example | | | | | | | |
|---|---|---|---|---|---|---|---|---|
| | 1 (Comparison) | 2 (Comparison) | 3 (Comparison) | 4 | 5 | 6 | 7 | 8 |
| K Value | 70 | 60 | 70 | 62 | 60 | 59 | 50 | 60 |
| Vinyl acetate content | 0 | 0 | 5 | 7 | 14 | 15 | 14 | 20 |
| Viscosity [Pa · s] | 13 | 15 | 17 | 3 | 2 | 2.1 | 2.2 | 2.5 |
| −10 | 0.132 | 0.159 | 0.156 | 0.128 | 0.108 | 0.122 | 0.100 | 0.120 |
| 0 | 0.190 | 0.176 | 0.192 | 0.164 | 0.138 | 0.170 | 0.179 | 0.176 |
| 10 | 0.176 | 0.148 | 0.182 | 0.182 | 0.196 | 0.192 | 0.225 | 0.195 |
| 20 | 0.130 | 0.104 | 0.120 | 0.154 | 0.200 | 0.197 | 0.194 | 0.146 |
| 30 | 0.076 | 0.069 | 0.070 | 0.099 | 0.144 | 0.082 | 0.118 | 0.077 |
| 40 | 0.033 | 0.032 | 0.027 | 0.051 | 0.064 | 0.033 | 0.045 | 0.031 |

Paste types were used as the PVC homopolymer or copolymer for the compositions of Examples 1 to 3. Suspension polymers were used as copolymers for the compositions of Examples 4 to 8 according to the invention. For Example 6, isodecyl phthalate was used as plasticizer instead of diisononyl phthalate.

As can be seen from Tables 1 and 2, the plastisols of Examples 1 to 3 (prior art) are unsuitable for spraying by the airless method on account of their high viscosity. The compositions of Examples 4 to 8 according to the invention are distinguished by low viscosity so that they may readily be sprayed by the airless method. Examples 4 to 8 according to the invention show high stability in storage. As can be seen from accompanying FIGS. 1 and 2, the plastisols according to the invention in their gelled state have a distinctly higher damping factor at temperatures of from about +10° C. to +30° C. than the prior art compositions of Examples 1 to 3.

Explanation of FIGS. 1 and 2

FIG. 1 shows the dependence on temperature of the loss factor of the Comparison Examples (1, 2, 3) by comparison with the Examples according to the invention (4 to 8) standardized to a coating weight of 50%.

FIG. 2 shows the dependence on temperature of the loss factor of the above-mentioned Examples standardized to a layer thickness ratio of 4:1.

Figure 1:
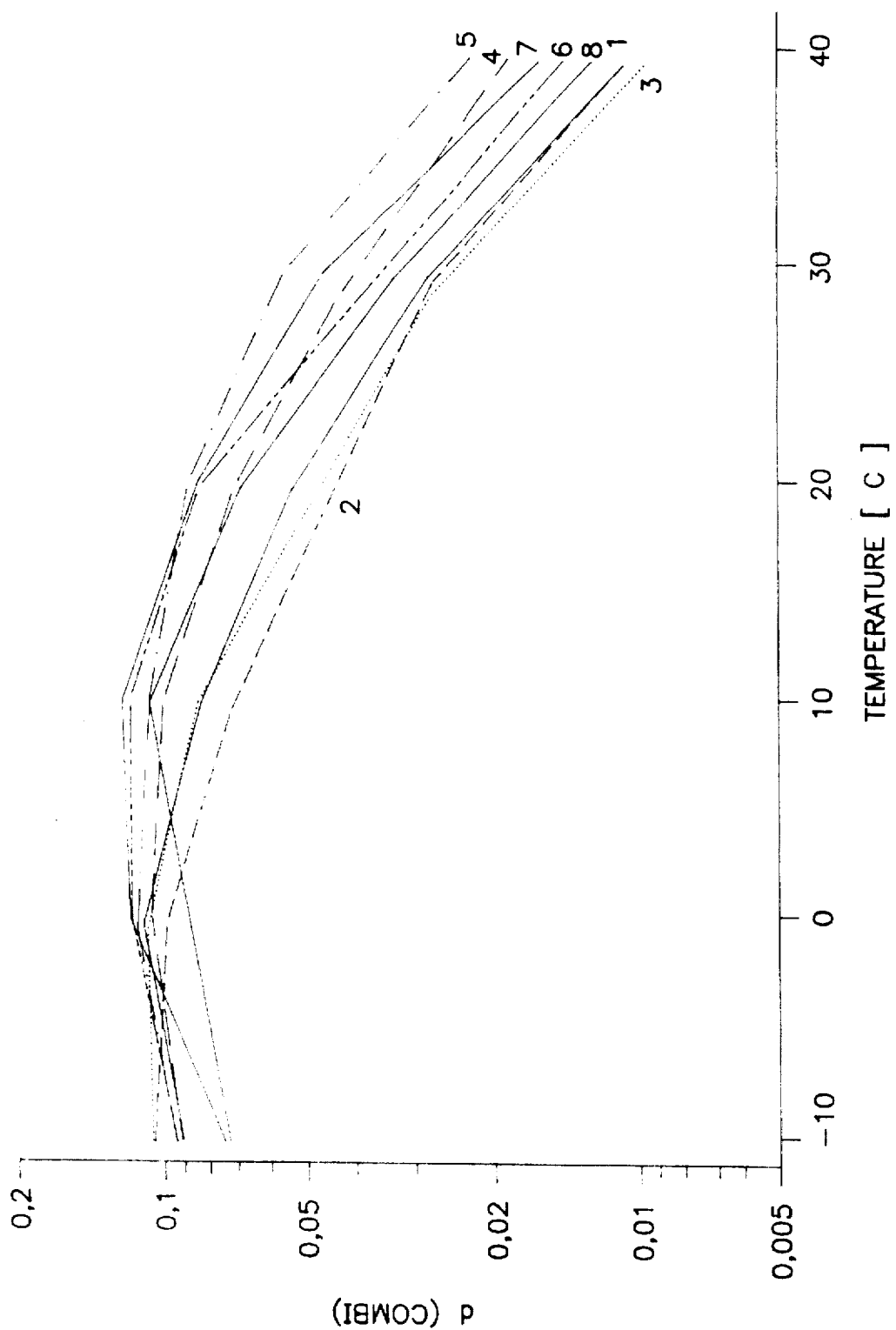
FIGS. 1 and 2 show the combined loss factor at 200 Hz of coated steel strips as determined in accordance with DIN 53440, Part 3.
Figure 2:
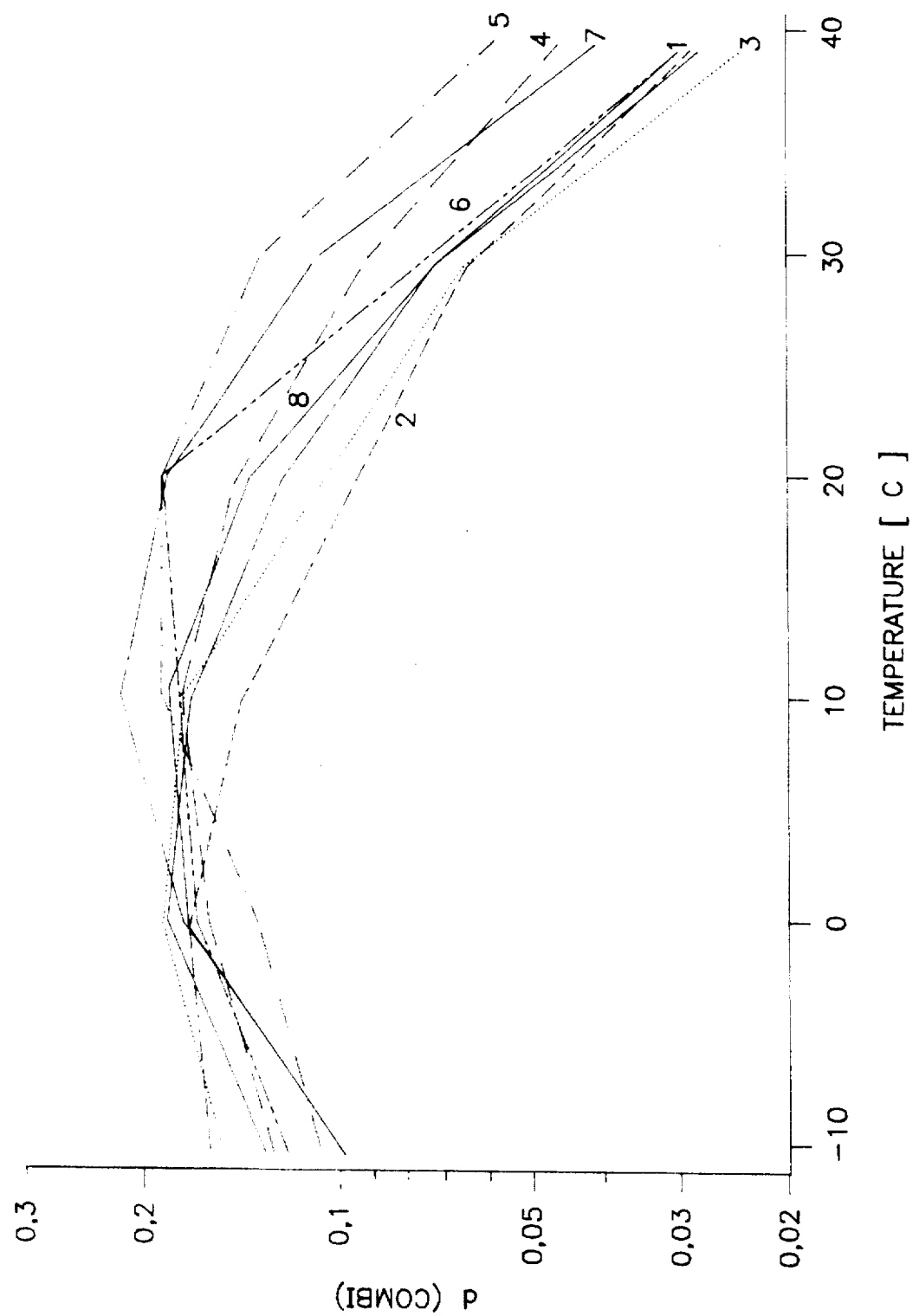

It is clearly apparent from FIGS. 1 and 2 that the plastisol compositions of Examples 4 to 8 according to the invention have a distinctly higher loss factor than the prior art plastisols in the temperature range from 10° C. to 30° C. which is of particular relevance to the performance properties.

What is claimed:

1. Sprayable plastisol compositions based on powder-form organic polymers and plasticizers, comprising the product of combining:

about 5% to about 60% by weight of at least one vinyl chloride/vinyl acetate copolymer, about 5% to about 65% by weight of a plasticizer; and about 0.01% to about 5% by weight of a coupling agent, based on the weight of said compositions, wherein the combined loss factor of the gelled plastisol coating on steel strips with a coating weight of 50%, as measured at 200 Hz/10° C. in accordance with DIN 53 440, Part 3, is at least 0.1, wherein said plstisol is sprayable at about 23° C.

2. Plastisol compositions as claimed in claim 1, wherein said vinyl chloride/vinyl acetate copolymer has a vinyl acetate content of about 5% to about 20% by weight, based on the copolymer.

3. Plastisol compositions as claimed in claim 1, wherein said vinyl chloride/vinyl acetate copolymer has a vinyl acetate content of about 7% to about 19% by weight, based on the copolymer.

4. Plastisol compositions as claimed in claim 1, wherein said copolymer has a K value, as measured in accordance with DIN 53726, of about 40 to about 80.

5. Plastisol compositions as claimed in claim 1, wherein said copolymer has a K value, as measured in accordance with DIN 53726, of about 50 to about 65.

6. Plastisol compositions as claimed in claim 1, wherein said plasticizer is selected from the group consisting of alkyl phthalates, organic phosphates, adipates, sebacates, benzyl benzoate, alkyl sulfonic acid esters of phenol, alkyl sulfonic acid esters of cresol, dibenzyl toluene, diphenyl ether and mixtures thereof.

7. Plastisol compositions as claimed in claim 6, wherein said alkyl phthalates are selected from the group consisting of dibutyl phthalate, dioctyl phthalate, benzyl butyl phthalate, dibenzyl phthalate, diisononyl phthalate, diisodecyl phthalate, diundecyl phthalate and mixtures thereof.

8. Plastisol compositions as claimed in claim 1, wherein the copolymer-to-plasticizer ratio is about 1:1 to about 1:4.

9. Plastisol compositions as claimed in claim 1, wherein the copolymer-to-plasticizer ratio is about 1:1.5 to about 1:2.5.

10. Plastisol compositions as claimed in claim 1, wherein said coupling agent is selected from the group consisting of polyaminoamides, epoxy resins in combination with heat-curing crosslinking agents, phenolic resins, terpene/phenol resins, diisocyanates, polyisocyanates, blocked diisocyanates, blocked polyisocyanates and mixtures thereof.

11. Plastisol compositions as claimed in claim 10, wherein said heat-curing crosslinking agent is dicyanodiamide.

12. Plastisol compositions as claimed in claim 10, wherein said polyaminoamide is selected from the group consisting of the reaction product of polyamines and dimerized fatty acids, the reaction product of polyamines and polymerized fatty acids and mixtures thereof.

13. Plastisol compositions as claimed in claim 1, further comprising up to about 40% by weight of fillers.

14. Plastisol compositions as claimed in claim 13, wherein said fillers are selected from the group consisting of calcium carbonate, heavy spar, mica, vermiculite, pigments and mixtures thereof.

15. Plastisol compositions as claimed in claim 1, further comprising at least one reactive additive.

16. Plastisol compositions as claimed in claim 15, wherein said reactive additive is a chemically crosslinking substance.

17. Plastisol compositions as claimed in claim 15, wherein said reactive additive is selected from the group consisting of diisocyanates, polyisocyanates, blocked diisocyanates, blocked polyisocyanates, microencapsulated diisocyanates, microencapsulated polyisocyanates, diamines, polyamines, polyaminoamides, hydroxyfunctional compounds, the combination of diepoxy compounds with diamines, the combination of diepoxy compounds with polyamines, the combination of diepoxy compounds with polyaminoamides, the combination of polyepoxy compounds with diamines, the combination of polyepoxy compounds with polyamines, the combination of polyepoxy compounds with polyaminoamides, and mixtures thereof.

18. Plastisol compositions as claimed in claim 17, wherein said hydroxyfunctional compounds are selected from the group consisting of polyester polyols, polyether polyols and mixtures thereof.

19. Plastisol compositions as claimed in claim 1, further comprising a blowing agent.

20. Plastisol compositions as claimed in claim 19, wherein said blowing agent is azodicarbonamide.

21. Plastisol compositions as claimed in claim 19, wherein said blowing agent is selected from the group consisting of azo compounds, N-nitroso compounds, sulfonyl hydrazides, sulfonyl semicarbazides, polyvinylidene chloride hollow microbeads and mixtures thereof.

22. Plastisol compositions as claimed in claim 21, wherein said azo compound is azo-bis-isobutyronitrile.

23. Plastisol compositions as claimed in claim 21, wherein said N-nitroso compound is dinitrosopentamethylene tetraamine.

24. Plastisol compositions as claimed in claim 21, wherein said sulfonyl hydrazide is 4,4'-hydroxy-bis-(benzenesulfonic acid hydrazide).

25. Plastisol compositions as claimed in claim 21, wherein said sulfonyl semicarbazides comprise p-toluene sulfonyl semicarbazide.

26. In a method for coating stiff substrates, more particularly metal plates, on or in motor vehicles to suppress mechanical vibration or to reduce the noise produced by particle impact or to prevent air vibration in cavities, wherein the improvement comprises applying thereto the plastisol compositions of claim 1.

27. In a method for simultaneously protecting substrates against abrasion and corrosion, wherein the improvement comprises applying thereto the plastisol compositions of claim 1.

28. An article of manufacture coated with a gelled plastisol composition of claim 1.

29. Sprayable plastisol compositions based on powder-form organic polymers and plasticizers, comprising the product of combining:

about 45 parts by weight vinyl chloride/vinyl acetate copolymer having a vinyl acetate content of about 7% to about 19% by weight;

about 26 parts by weight diisononylphthalate;

about 1 part by weight calcium oxide;

about 15.5 parts by weight ground chalk;

about 8 parts by weight precipitated chalk;

about 0.5 part by weight zinc oxide;

about 1 part by weight polyaminoamide; and about 3 parts by weight naphtha, wherein said plastisol is sprayable at about 23° C.

* * * * *